US012019381B2

(12) United States Patent
Baba et al.

(10) Patent No.: US 12,019,381 B2
(45) Date of Patent: Jun. 25, 2024

(54) ELECTROPHOTOGRAPHIC MEMBER AND ELECTROPHOTOGRAPHIC IMAGE-FORMING APPARATUS

(71) Applicant: CANON KABUSHIKI KAISHA, Tokyo (JP)

(72) Inventors: Yusuke Baba, Kanagawa (JP); Masaaki Takahashi, Kanagawa (JP); Masahiro Takenaga, Kanagawa (JP); Takeshi Suzuki, Kanagawa (JP); Masayuki Onuma, Chiba (JP); Kaoru Okamoto, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/059,921

(22) Filed: Nov. 29, 2022

(65) Prior Publication Data

US 2023/0176506 A1 Jun. 8, 2023

(30) Foreign Application Priority Data

Dec. 3, 2021 (JP) ................................ 2021-197198

(51) Int. Cl.
*G03G 15/16* (2006.01)

(52) U.S. Cl.
CPC ....... *G03G 15/1605* (2013.01); *G03G 15/162* (2013.01)

(58) Field of Classification Search
CPC .. G03G 15/1605; G03G 15/162; G03G 15/75; G03G 15/751; G03G 15/754
See application file for complete search history.

(56) References Cited

U.S. PATENT DOCUMENTS

| | | | | |
|---|---|---|---|---|
| 6,328,682 | B1 * | 12/2001 | Shudo ................ | G03G 15/2057 492/53 |
| 2006/0133863 | A1 * | 6/2006 | Asakura ............. | G03G 15/2025 399/307 |
| 2014/0133891 | A1 | 5/2014 | Kitano | |
| 2015/0241822 | A1 | 8/2015 | Matsumoto et al. | |

FOREIGN PATENT DOCUMENTS

| | | | |
|---|---|---|---|
| JP | H05107874 | A | 4/1993 |
| JP | H11212374 | A | 8/1999 |
| JP | 2004070255 | A | 3/2004 |
| JP | 2009025421 | A | 2/2009 |
| JP | 2010015143 | A | 1/2010 |
| JP | 2013015683 | A | 1/2013 |
| JP | 2014089445 | A | 5/2014 |
| JP | 2015203836 | A | 11/2015 |
| JP | 2017068034 | A | 4/2017 |

* cited by examiner

*Primary Examiner* — Sophia S Chen
(74) *Attorney, Agent, or Firm* — CANON U.S.A., INC. IP Division

(57) ABSTRACT

An electrophotographic member includes a base layer, an elastic layer, and a surface layer stacked in this order. The surface layer contains a fluorine resin and a fluorine rubber, the fluorine rubber is contained at a proportion of 0.5 parts by mass or more and 1.0 parts by mass or less with respect to 1 part by mass of the fluorine resin, and the surface layer further contains a compound represented by formula (1):

$$CH_3(CH_2)_m—O—((CH_2)_lO)_n—OH \quad (1)$$

In formula (1), m, l, and n each independently represent an integer of 1 or more.

13 Claims, 2 Drawing Sheets

ELECTROPHOTOGRAPHIC MEMBER AND ELECTROPHOTOGRAPHIC IMAGE-FORMING APPARATUS

BACKGROUND

Technical Field

The present disclosure relates to an electrophotographic member to be used in an electrophotographic image-forming apparatus and relates to an electrophotographic image-forming apparatus.

Description of the Related Art

Recently, electrophotographic image-forming apparatuses are required to form high-quality electrophotographic images even on a recording medium having uneven surface having a surface unevenness exceeding 10 μm, such as cardboard and embossed paper. However, when an electrophotographic image is formed on the surface of a recording medium having an uneven surface, the transfer of a toner image to the depressed portions on the surface of the recording medium may become insufficient.

For such a disadvantage, it is effective to use an intermediate transfer member including a surface layer and an elastic layer excellent in adaptability to the surface profile of a recording medium. Japanese Patent Laid-Open No. 2010-15143 discloses a multi-layer belt including at least three layers of a base layer, an elastic layer, and a surface layer sequentially stacked from the inner peripheral surface toward the outer peripheral surface, wherein the surface layer contains rubber latex in which the proportion of a fluorine rubber is higher than 1 part by mass and 5 parts by mass or less with respect to 1 part by mass of a fluorine resin and contains a curing agent.

Japanese Patent Laid-Open No. 2010-15143 discloses that the multi-layer belt according to Japanese Patent Laid-Open No. 2010-15143 can efficiently transfer a small particle size toner also to paper having a surface roughness exceeding 10 μm.

However, according to studies by the present inventors, in some cases, a toner cannot be sufficiently transferred to a recording medium having a large surface unevenness, for example, exceeding 100 μm even if using the multi-layer belt according to Japanese Patent Laid-Open No. 2010-15143.

SUMMARY

At least one aspect of the present disclosure is directed to providing an electrophotographic member that can be used as an intermediate transfer member allowing secondary transfer of an unfixed toner image more accurately, even to a recording medium having a surface unevenness exceeding 100 μm. Further, at least one aspect of the present disclosure is directed to providing an electrophotographic image-forming apparatus that can form a high-quality electrophotographic image even on a recording medium having a surface unevenness exceeding 100 μm.

According to at least one aspect of the present disclosure, there is provided an electrophotographic member including a base layer, an elastic layer, and a surface layer stacked in this order. The surface layer contains a fluorine resin and a fluorine rubber. The fluorine rubber is contained at a proportion of 0.5 parts by mass or more and 1.0 parts by mass or less with respect to 1 part by mass of the fluorine resin. The surface layer further contains a compound represented by formula (1):

$$CH_3(CH_2)_mO—((CH_2)_lO)_n—OH \quad (1),$$

in formula (1), m, l, and n each independently represent an integer of 1 or more. According to at least one aspect of the present disclosure, there is provided an electrophotographic image-forming apparatus comprising an intermediate transfer member which is constituted of the above-mentioned electrophotographic member.

Further features of the present disclosure will become apparent from the following description of exemplary embodiments with reference to the attached drawings.

DESCRIPTION OF THE EMBODIMENTS

Figure 1:
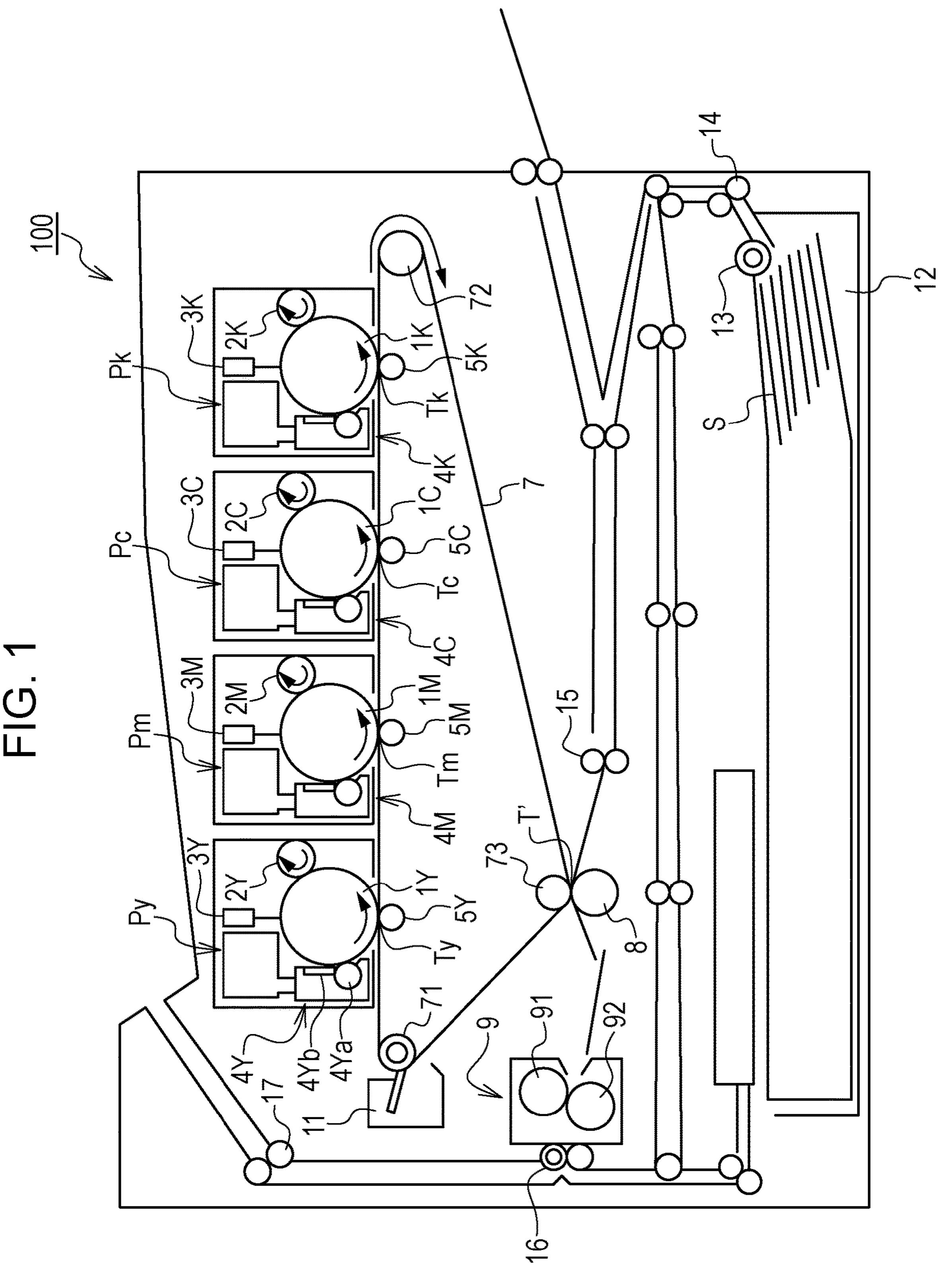
FIG. 1 is a cross-sectional view showing an example of the electrophotographic image-forming apparatus using an electrophotographic member according to an aspect of the present disclosure.

In the present specification, the descriptions of "XX or more and YY or less" and "XX to YY" representing a numerical range mean a numerical range including the lower and upper limits that are endpoints, otherwise specified. In stepwise numerical ranges described herein, any combination of the upper and lower limits of each numerical range is disclosed. In the present specification, the unit of surface resistivity, "Q/", means "Q/square".

As the reason for that the multi-layer belt according to Japanese Patent Laid-Open No. 2010-15143 cannot secondarily transfer an unfixed toner image accurately to a recording medium having a surface unevenness exceeding 100 μm, the present inventors infer that the surface free energy of the multi-layer belt is still too high to secondarily transfer an unfixed toner image with high accuracy to a recording medium having a surface unevenness exceeding 100 μm. That is, the surface layer of the multi-layer belt contains a fluorine rubber at a proportion of higher than 1 part by mass and 5 parts by mass or less with respect to 1 part by mass of a fluorine resin. The technical significance thereof is disclosed in paragraph 0045 of Japanese Patent Laid-Open No. 2010-15143 that the surface free energy in the surface layer can be adjusted to a desired value. Japanese Patent Laid-Open No. 2010-15143 discloses that the surface free energy desirable for the surface layer is 20 to 40 mN/m and that a desirable hardness when pushed from the surface layer side by 3 μm is 0.1 to 1.5 MPa.

Here, the surface free energy of the surface layer increases with an increase in the content ratio of the fluorine rubber with respect to the fluorine resin in the surface layer, resulting in a disadvantage in the secondary transferability of an unfixed toner image supported on the surface of the surface layer to the recording medium. In contrast, an increase in the content ratio of the fluorine rubber with respect to the fluorine resin in the surface layer increases the flexibility of the surface layer.

The present inventors have studied to adjust the content ratio of the fluorine rubber with respect to the fluorine resin to less than 1 part by mass in order to reduce the surface free energy of the multi-layer belt according to Japanese Patent Laid-Open No. 2010-15143. However, as described above, a decrease in the amount of the fluorine rubber in the surface layer causes an increase in the hardness of the surface layer, and the surface layer cannot adapt to the deformation of the elastic layer in some cases. The present inventors obtained the knowledge that the adjustment of the content ratio of the fluorine rubber with respect to the fluorine resin in the surface layer to a range of 0.5 parts by mass or more and 1.0 parts by mass or less is effective for decreasing the surface free energy of the outer surface while maintaining the flexibility of the surface layer.

Incidentally, in order to improve the secondary transferability of an unfixed toner image on the intermediate transfer belt to the recording medium, it may be conceivable to increase the secondary transfer vias. However, an increase in the secondary transfer vias has a risk of causing dielectric breakdown of the surface layer when the surface layer does not have conductivity as in the multi-layer belt according to Japanese Patent Laid-Open No. 2010-15143.

Accordingly, the present inventors studied to impart conductivity to the surface layer having a content ratio of the fluorine rubber in a range of 0.5 parts by mass or more and 1.0 parts by mass or less with respect to fluorine resin while maintaining the excellent flexibility and the low surface free energy.

As a result, it was found that the above purposes can be achieved well by an electrophotographic member including, on an elastic layer, a surface layer containing a fluorine rubber at a proportion of 0.5 parts by mass or more and 1.0 parts by mass or less with respect to 1 part by mass of a fluorine resin and further containing a compound (hereinafter, also referred to as "polyoxyalkylene alkyl ether") represented by formula (1):

$$CH_3(CH_2)_m—O—((CH_2)_lO)_n—OH \quad (1),$$

in formula (1), m, l, and n each independently represent an integer of 1 or more.

An aspect of the electrophotographic member according to the present disclosure will now be described in detail, but the electrophotographic member according to the present disclosure is not limited to this aspect.

Figure 2A:
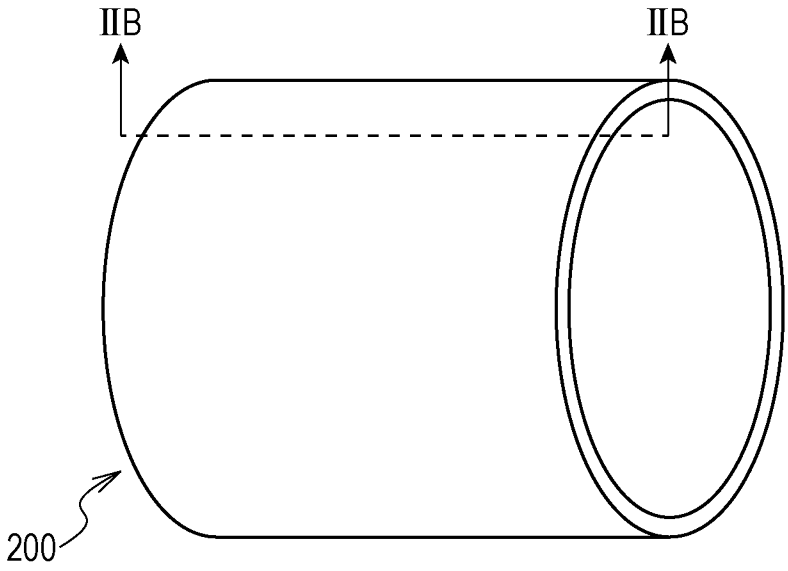
FIG. 2A is a perspective view of an intermediate transfer member 200 according to an aspect of the present disclosure.
Figure 2B:
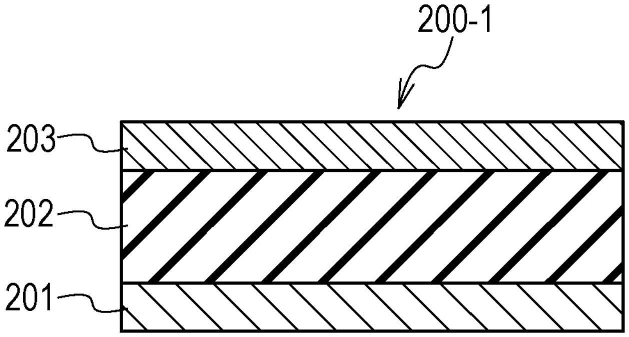
FIG. 2B is a cross-sectional view taken along the line IIB-IIB of FIG. 2A.

FIG. 2A shows a perspective view of an electrophotographic member (hereinafter, also referred to as "electrophotographic belt") 200 having an endless belt shape according to an aspect of the present disclosure. The electrophotographic belt 200 includes, for example, as shown in FIG. 2B of a cross-sectional view taken along the line IIB-IIB of FIG. 2A, a base layer 201 having an endless shape, an elastic layer 202 formed on the outer peripheral surface of the base layer, and a surface layer 203 formed on the outer peripheral surface of the elastic layer. That is, the electrophotographic belt 200 has a structure in which the base layer, the elastic layer, and the surface layer are stacked in this order. The outer surface 200-1 of the surface layer constituting the outer surface of the electrophotographic belt 200 becomes a supporting surface for an unfixed toner image, for example, when this electrophotographic belt is used as an intermediate transfer belt.

The surface resistivity measured on the surface of a surface layer constituting the outer surface of an electrophotographic member in an environment of a temperature of 23° C. and a relative humidity of 50% is, for example, $1.0\times10^7 \Omega/\square$ or more and $3.0\times10^{11} \Omega/\square$ or less and can be particularly $1.0\times10^8 \Omega/\square$ or more and $2.0\times10^{11} \Omega/\square$ or less. When the electrophotographic belt is used as, for example, an intermediate transfer belt, a transfer electric field can be easily obtained during secondary transfer by adjusting the surface resistivity of the outer surface within the above range, and occurrence of defects of images (such as image voids and roughness) caused by the secondary transfer can be effectively prevented.

In addition, the transfer voltage can be more effectively suppressed from becoming excessive, and an enlargement in the power supply and an increase in cost can be effectively suppressed.

The volume resistivity of the electrophotographic member is not particularly limited and is, for example, $1.0\times10^7$ Ω-cm or more and $5.0\times10^{11}$ Ω-cm or less and can be particularly $1.0\times10^8$ Ω-cm or more and $2.0\times10^{11}$Ω•cm or less. When the electrophotographic belt is used as, for example, an intermediate transfer belt, primary and secondary transfers of a toner image from the electrophotographic photosensitive member can be more stably performed by controlling the volume resistivity within a semiconductive region as above.

Base Layer

The base layer 201 to be used has a cylindrical, columnar, or endless belt shape corresponding to the shape of the intermediate transfer member. The material of the base layer 201 is not particularly limited as long as it is a material having excellent heat resistance and mechanical strength, and examples thereof include metals, such as aluminum, iron, copper, and nickel; alloys, such as stainless steel and brass; ceramics, such as alumina and silicon carbide; and resins, such as polyether ether ketone, polyethylene terephthalate, polybutylene naphthalate, polyester, polyimide, polyamide, polyamideimide, polyacetal, and polyphenylene sulfide.

Incidentally, when a thermosetting resin or a thermoplastic resin is used as the material of the base layer 201, conductivity may be provided by addition of a conductive powder, such as a metal powder, a conductive oxide powder, or conductive carbon. The volume resistivity of the base layer 201 is, for example, $1.0\times10^8$ Ω•cm or more and $1.0\times10^{11}$Ω•cm or less. The surface resistivity of the base layer 201 is, for example, $3.0\times10^9 \Omega/\square$ or more and $3.0\times10^{12} \Omega/\square$ or less.

In the present disclosure, from the viewpoint of mechanical strength and conductivity, a polyimide film containing carbon black can be particularly used. The thickness of the base layer 201 can be 10 μm or more and 500 μm or less, or 30 μm or more and 150 μm or less.

Elastic Layer

On the outer peripheral surface of the base layer 201, an elastic layer 202 is formed. The toner on the surface layer of the intermediate transfer member can adapt to the depressed portions of the paper surface by providing the elastic layer 202. Examples of the material of the elastic layer 202 include a natural rubber, a styrene-butadiene rubber, a butadiene rubber, an isoprene rubber, a nitrile rubber, a chloroprene rubber, a butyl rubber, an ethylene-propylene rubber, a chlorosulfonated rubber, an acrylate rubber, an epichlorohydrin rubber, a urethane rubber, a silicone rubber, and a fluorine rubber. Among these materials, a silicone rubber may be used from the viewpoint of small permanent deformation due to compression and excellent ozone resistance.

The hardness of the elastic layer 202 can be 15 degrees or more and 80 degrees or less, or 20 degrees or more and 60 degrees or less, as a type A hardness. The thickness of the elastic layer 202 can be 50 μm or more and 500 μm or less, or 100 μm or more and 400 μm or less, considering the mechanical strength and the flexibility.

The elastic layer 202 may contain an electron conductive agent or an ion conductive agent as a conductive agent. Examples of the electron conductive agent include conductive carbon black, such as acetylene black and Ketjen black, and graphite, graphene, a carbon fiber, and a carbon nanotube. The examples of the electron conductive agent also include a powder of a metal such as silver, copper, or nickel, conductive zinc oxide, conductive calcium carbonate, conductive titanium oxide, conductive tin oxide, and conductive mica. Among these materials, conductive carbon black may be used from the viewpoint of ease of control of electric resistance.

Examples of the ion conductive agent include not only a lithium salt and a potassium salt but also pyridine-based, alicyclic amine-based, and aliphatic amine-based ionic liquids. Among these materials, an ionic liquid may be used from the viewpoint of environmental stability and suppressing polarization due to and durability. The blending prescription of the ion conductive agent in the elastic layer 202 may be 35 parts by mass or less, or 25 parts by mass or less, based on 100 parts by mass of a silicone rubber from the viewpoint of mechanical strength. Consequently, stable conductivity suitable for the intermediate transfer member is imparted to the elastic layer 202.

The elastic layer 202 may further contain an additive, such as a filler, a cross-linking accelerator, a cross-linking retarder, a cross-linking assistant, a scorch inhibitor, an anti-aging agent, a softener, a heat stabilizer, a flame retardant, an auxiliary flame retardant, a UV absorber, and a rust inhibitor. In particular, examples of the filler include a reinforcing filler, such as fumed silica, crystalline silica, wet silica, fumed titanium oxide, and cellulose nanofiber. The reinforcing filler may be surface-modified by an organic silicon compound, such as organoalkoxysilane, organohalosilane, organosilazane, diorganosiloxane oligomer of which both molecular chain ends are sealed with silanol groups, and cyclic organosiloxane, from the viewpoint of ease of dispersion in a silicone rubber.

In order to strongly adhere between the base layer 201 and the elastic layer 202, a primer may be appropriately applied to the outer surface of the base layer 201. The primer used herein is a coating solution in which a silane coupling agent, a silicone polymer, hydrogenated methyl siloxane, alkoxysilane, a reaction-accelerating catalyst, or a coloring agent such as red oxide is appropriately blended and dispersed in an organic solvent. The primer may be a commercial product. The primer treatment is performed by application of the primer to the outer surface of the base layer 201 and drying or calcination thereof.

The primer can be appropriately selected according to the material of the base layer 201, the type of the elastic layer, or the form of the cross-linking reaction. In particular, when the elastic layer 202 contains many unsaturated aliphatic groups, a primer containing a hydrosilyl group can be used in order to impart adhesiveness by a reaction with the unsaturated aliphatic groups. Examples of commercially available primers having such characteristics include DY39-051A/B (product name, manufactured by DuPont Toray Specialty Materials K.K.).

When the elastic layer 202 contains many hydrosilyl groups, a primer containing an unsaturated aliphatic group can be used. Examples of commercially available primers having such characteristics include DY39-067 (product name, manufactured by DuPont Toray Specialty Materials K.K.). Examples of the primer include those containing an alkoxy group. Alternatively, the adhesive force can be further increased by assisting the cross-linking reaction between the base layer 201 and the elastic layer 202 through surface treatment, such as UV irradiation, of the base layer surface. Examples of the primer other than above include X-33-156-20, X-33-173A/B, and X-33-183A/B (all product names, manufactured by Shin-Etsu Chemical Co., Ltd.) and DY39-90A/B, DY39-110A/B, DY39-125A/B, and DY39-200A/B (all product names, manufactured by DuPont Toray Specialty Materials K.K.).

Surface Layer

The surface layer 203 contains a fluorine resin and a fluorine rubber. The content of the fluorine resin in the surface layer can be 50 mass % or more and 66 mass % or less based on the total mass of the surface layer. When the content of the fluorine resin in the surface layer is within the range above, the outer surface of the surface layer shows more excellent toner release properties. The content of the fluorine rubber in the surface layer is 0.5 parts by mass or more and 1.0 parts by mass or less with respect to 1 part by mass of the fluorine resin. When the content of the fluorine rubber in the surface layer is within the above, the surface layer is provided with flexibility that allows sufficient adaptability to deformation of the elastic layer, furthermore, flexibility that allows sufficient adaptability also to a surface of a recording medium having an unevenness of 100 μm or more on the surface.

Fluorine Resin

The fluorine resin is not particularly limited, and examples thereof include a tetrafluoroethylene-hexafluoropropylene copolymer (FEP) resin, a tetrafluoroethylene-perfluoroalkyl vinyl ether copolymer (PFA) resin, and a tetrafluoroethylene (PTFE) resin.

Fluorine Rubber

Examples of the fluorine rubber include a vinylidene fluoride rubber (FKM), a tetrafluoroethylene-propylene rubber (FEPM), and a tetrafluoroethylene-perfluoromethyl vinyl ether rubber (FFKM). Among them, FKM is excellent in heat resistance, aging resistance, and ozone resistance and can be particularly used. Incidentally, FKM is a fluorine rubber including $-(CH_2CF_2)-$ and $(CF(CF_3)CF_2)-$ as basic constituent units.

Polyoxyalkylene Alkyl Ether

The compound (polyoxyalkylene alkyl ether) represented by formula (1) contained in the surface layer functions as a conductive agent that imparts conductivity to the surface layer.

$$CH_3(CH_2)_m-O-((CH_2)_lO)_n-OH \quad (1)$$

in formula (1), m, l, and n each independently represent an integer of 1 or more.

As described above, as a method for making the surface layer electroconductive, there is a method of using an electron conductive agent such as carbon black. However, when an electron conductive agent is added to a surface layer in which the proportion of the fluorine rubber is 0.5 to 1.0 parts by mass with respect to 1 part by mass of the fluorine resin, an increase in the hardness of the surface layer is caused, and the adaptability to deformation of the elastic layer and the adaptability to a surface of a recording medium having an unevenness of 100 μm or more may be decreased. In contrast, the polyoxyalkylene alkyl ether represented by formula (1), even if the amount thereof is only for imparting a predetermined conductivity to the surface layer, can maintain the flexibility of the surface layer according to the present disclosure in which the amount of the fluorine rubber is small.

Examples of the polyoxyalkylene alkyl ether represented by formula (1) include polyoxyethylene lauryl ether, polyoxyethylene tridecyl ether, polyoxyethylene isotridecyl ether, polyoxyethylene myristyl ether, and polyoxyethylene pentadecyl ether. Among the examples above, polyoxyethylene lauryl ether or polyoxyethylene myristyl ether can be particularly used.

As such a polyoxyalkylene alkyl ether, a commercially available product can be used. For example, "Emulgen 120", "Emulgen 147", and "Emulgen 150" (all product names, manufactured by Kao Corporation) can be used as the polyoxyethylene lauryl ether, and "Emulgen 4085" (product name, manufactured by Kao Corporation) can be used as the polyoxyethylene myristyl ether.

The content of the polyoxyalkylene alkyl ether in the surface layer is not particularly limited and can be, for example, an amount that can adjust the surface resistivity measured for the outer surface of the surface layer in a range of, for example, $1.0\times10^{7}\Omega/\square$ or more and $3.0\times10^{11}\Omega/\square$ or less, in particular, $1.0\times10^{8}\Omega/\square$ or more and $2.0\times10^{11}\Omega/\square$ or less. Specifically, for example, the amount in the surface layer can be 1 mass % or more and 10 mass % or less, in particular, 3 mass % or more and 8 mass % or less.

The surface layer 203 can have an elastic coefficient of 50 MPa or more and 100 MPa or less. The surface layer 203 having an elastic coefficient of 50 MPa or more has more excellent wear resistance and does not wear out easily even with long-term use.

When the elastic coefficient is 100 MPa or less, the elasticity of the elastic layer 202 can work more effectively. The thickness of the surface layer 203 can be 5 μm or more and 30 μm or less. The surface layer 203 having a thickness of 5 μm or more does not wear out easily even with long-term use. When the thickness of the surface layer 203 is 30 μm or less, the elasticity of the elastic layer 202 can work more effectively.

In addition, a primer layer may be provided between the elastic layer 202 and the surface layer 203 as needed. The thickness of the primer layer may be 0.1 μm or more and 15 μm or less, or 0.5 μm or more and 10 μm or less, from the viewpoint of inhibiting the elastic function.

Electrophotographic Image-Forming Apparatus

An example of an electrophotographic image-forming apparatus using the electrophotographic belt according to an aspect of the present disclosure as the intermediate transfer belt will be described with reference to FIG. 1. Incidentally, the present disclosure is not limited to the following descriptions.

The electrophotographic image-forming apparatus 100 of FIG. 1 is a color electrophotographic image-forming apparatus (color laser printer). In this electrophotographic image-forming apparatus 100, image-forming units Py, Pm, Pc, and Pk of yellow (Y), magenta (M), cyan (C), and black (K), respectively, are arranged in order along the flat portion of the intermediate transfer belt 7 in the moving direction thereof. Here, 1Y, 1M, 1C, and 1K each indicate an electrophotographic photosensitive member, 2Y, 2M, 2C, and 2K each indicate a charge roller, 3Y, 3M, 3C, and 3K each indicate a laser exposure device, 4Y, 4M, 4C, and 4K each indicate a development device, 5Y, 5M, 5C, and 5K each indicate a primary transfer roller, and Ty, Tm, Tc, and Tk indicate a primary transfer part. Since the basic configurations of the image-forming units Py, Pm, Pc, and Pk are the same, the details of the image-forming units will be described for the yellow image-forming unit Py only.

The yellow image-forming unit Py includes a drum-type electrophotographic photosensitive member (hereinafter, also referred to as "photosensitive drum" or "first image-supporting member") 1Y as an image-supporting member. The photosensitive drum 1Y is one formed by using an aluminum cylinder as a base and stacking a charge generation layer, a charge transport layer, and a surface protection layer in order on the base.

The yellow image-forming unit Py includes a charge roller 2Y as a charging unit. The surface of the photosensitive drum 1Y is uniformly charged by applying a charging bias to the charge roller 2Y.

A laser exposure device 3Y as an image exposure unit is arranged above the photosensitive drum 1Y. The laser exposure device 3Y scans and exposes the surface of the uniformly charged photosensitive drum 1Y according to the image information and forms an electrostatic latent image of a yellow color component on the surface of the photosensitive drum 1Y.

The electrostatic latent image formed on the photosensitive drum 1Y is developed by a development device 4Y as a developing unit using a toner as a developer. That is, the development device 4Y includes a developing roller 4Ya as a developer-carrying member and a control blade 4Yb as a developer amount-controlling member and accommodates a yellow toner as a developer. The developing roller 4Ya supplied with a yellow toner is in low-pressure contact with the photosensitive drum 1Y in the developing section and is rotated at a speed different from the photosensitive drum 1Y in the forward direction. The yellow toner conveyed to the developing unit by the developing roller 4Ya adheres to the electrostatic latent image formed on the photosensitive drum 1Y by applying a developing bias to the developing roller 4Ya. Consequently, a visible image (yellow toner image) is formed on the photosensitive drum 1Y.

The intermediate transfer belt 7 is stretched over a drive roller 71, a tension roller 72, and a driven roller 73 and is in contact with the photosensitive drum 1Y to be moved (rotary driven) to the direction of the arrow in the figure.

The yellow toner image formed on the photosensitive drum 1Y (on the first image-supporting member) and reached the primary transfer part Ty is primarily transferred on the intermediate transfer belt 7 by a primary transfer member (primary transfer roller 5Y) disposed to face the photosensitive drum 1Y via the intermediate transfer belt 7.

Similarly, the above image-forming operation is performed in each of the image-forming units Pm, Pc, and Pk of the respective magenta (M), cyan (C), and black (K) along with the movement of the intermediate transfer belt 7 to stack toner images of four colors of yellow, magenta, cyan, and black on the intermediate transfer belt 7. The toner layers of four colors are conveyed along with the movement of the intermediate transfer belt 7 and are batch-transferred on a transfer material S (hereinafter, also referred to as "second image-supporting member"), which is conveyed at a predetermined timing, by a secondary transfer roller 8 as a secondary transfer unit in a secondary transfer part T'. In such secondary transfer, a transfer voltage of several kilovolts is usually applied for securing a sufficient transfer rate, and at this time, an electric discharge may occur near the transfer nip. Incidentally, this electric discharge may contribute to a reduction in surface characteristics of the intermediate transfer member.

The transfer material S is supplied to a conveyance path from a cassette 12 containing the transfer material S by a pickup roller 13. The transfer material S supplied to the conveyance path is conveyed to the secondary transfer part T' synchronized with the toner images of four colors transferred to the intermediate transfer belt 7 by a conveyance roller pair 14 and registration roller pair 15.

The toner image transferred to the transfer material S is fixed by a fixing device 9 and becomes, for example, a full-color image. The fixing device 9 includes a fixing roller 91 having a heating unit and a pressurizing roller 92 and fixes an unfixed toner image on the transfer material S by heating and pressurizing. Subsequently, the transfer material S is discharged to the outside of the apparatus by a conveyance roller pair 16, a discharge roller pair 17, and so on.

A cleaning blade 11 as a cleaning unit of the intermediate transfer belt 7 is arranged downstream of the secondary transfer part T' in the driving direction of the intermediate transfer belt 7 and removes the transfer residual toner remaining on the intermediate transfer belt 7 without being transferred to the transfer material S in the secondary transfer part T'.

As described above, the electric transfer process of a toner image from the photosensitive member 1 to the intermediate transfer belt 7 and from the intermediate transfer belt 7 to the transfer material S is repeated. The electric transfer process is further repeated by repeating recording on a large number of transfer materials S.

Good transfer of a toner during the secondary transfer is possible by using the electrophotographic member of the present disclosure as the intermediate transfer belt 7 in the electrophotographic image-forming apparatus, and a transfer system maintaining good image quality even in long-term use can be realized.

According to an aspect of the present disclosure, it is possible to obtain an electrophotographic member that can be used as an intermediate transfer member allowing secondary transfer of an unfixed toner image more accurately, even to a recording medium having a surface unevenness exceeding 100 μm. According to another aspect of the present disclosure, it is possible to obtain an electrophotographic image-forming apparatus that can form a high-quality electrophotographic image even on a recording medium having a surface unevenness exceeding 100 μm.

EXAMPLES

The electrophotographic member and electrophotographic image-forming apparatus according to the present disclosure will now be described specifically using Examples. Incidentally, the electrophotographic member and electrophotographic image-forming apparatus according to the present disclosure are not limited to only the structures realized in the following Examples.

Example 1

Formation of Base Layer

Conductive carbon black (product name: Denka Black, manufactured by Denka Co., Ltd.) was added to an N-methyl-2-pyrrolidone solution (product name: U-Varnish A, manufactured by UBE Corporation) of polyamic acid, which is a polyimide precursor. On this occasion, the conductive carbon black was added in an amount of 19 mass % based on the total mass of the polyamic acid and the conductive carbon black and was mixed. The resulting mixture liquid was applied to the outer peripheral surface of a stainless steel (SUS304) cylindrical support member of 330-mm outer diameter and 300-mm length having a blast-treated surface. Subsequently, the cylindrical support member was heated in a heating furnace at a temperature of 220° C. for 30 minutes and then at a temperature of 350° C. for 30 minutes to polymerize the polyimide precursor applied to the outer peripheral surface of the cylindrical support member to form a polyimide film. After cooling, the polyimide film was taken out from the cylindrical support member to obtain a base layer with an endless belt shape having a thickness of 70 μm. The outer peripheral surface of the base layer was irradiated with excimer UV and subjected to hydrophilic treatment, and a primer liquid (product name: DY39-051A/B, manufactured by Dow Toray Co., Ltd.) was then applied thereto, followed by heating in a heating furnace at 160° C. for 10 minutes.

Formation of Elastic Layer

Potassium-bis(trifluoromethanesulfonyl)imide (product name: EF-N112, manufactured by Mitsubishi Materials Electronic Chemicals Co., Ltd.) as an ion conductive agent was mixed with an addition-curing liquid silicone rubber (product name: TSE3450 A/B, manufactured by Momentive Performance Materials, Inc.) in an amount of 0.2 parts by mass based on 100 parts by mass of the rubber. Subsequently, the mixture was mixed and defoamed with a planetary stirring and defoaming machine (product name: HM-500, manufactured by Keyence Corporation) to prepare a coating liquid for elastic layer.

Subsequently, the base material prepared above was attached to a cylindrical core, and a ring nozzle for discharging rubber was further attached coaxially with the core. The coating liquid for elastic layer was supplied to the ring nozzle using a liquid delivery pump and was discharged from a slit to apply the coating liquid for elastic layer onto the base material. On this occasion, a coating film was formed by adjusting the relative movement speed and the discharge amount of the liquid delivery pump such that the cured silicone rubber layer had a thickness of 280 μm. The base material in an attached state to the core was placed in a heating furnace and heated at 130° C. for 15 minutes and further at 180° C. for 60 minutes to cure the coating film. After cooling, the belt was taken out from the core to obtain a base layer having an elastic layer stacked on the outer peripheral surface.

Surface Modification of Elastic Layer

In order to enhance the adhesiveness between the elastic layer and the surface layer, the outer peripheral surface of the elastic layer was irradiated with excimer UV. As the UV irradiation light source, an excimer lamp (manufactured by M.D.COM Inc.) emitting a single wavelength of 172 nm was used.

The base layer provided with the elastic layer was put into the columnar core, arranged such that the elastic layer surface was located at a distance of 1 mm from the surface of the excimer UV lamp, and irradiated with excimer UV for 30 minutes in a space into which nitrogen gas and air were introduced while rotating the core at a rotation speed of 5 rpm. Consequently, a surface modification layer mainly constituted of $SiO_2$ was formed on the outer surface of the elastic layer.

Formation of Surface Layer

As a fluorine resin, a water dispersion of particles (particle size: 0.2 μm) of a copolymer of tetrafluoroethylene and hexafluoropropylene (FEP) (product name: 120-JRB, manufactured by Chemours-Mitsui Fluoroproducts Co., Ltd., FEP particle concentration: 54 mass %) was provided. A vinylidene fluoride-tetrafluoroethylene-hexafluoropropylene copolymer (FKM) (product name: DAI-EL Latex, manufactured by Daikin Industries, Ltd.) as fluorine rubber was added to the water dispersion such that the amount of FKM was 1 part by mass with respect to 1 part by mass of FEP. Furthermore, as a conductive agent, polyoxyethylene lauryl ether (product name: Emulgen 120, manufactured by Kao Corporation) was mixed at a proportion of 3 mass % with respect to the total amount of FEP and FKM. Thus, a coating solution for forming a surface layer was prepared.

The resulting coating solution for forming a surface layer was applied onto the surface modification layer of the elastic layer using a spray gun (product name: W-101, manufactured by Anest Iwata Corporation) such that the dry film thickness was 10 μm. Subsequently, the base layer provided with a coating film of the coating solution for forming a surface layer on the elastic layer was heated in a heating furnace of a temperature of 200° C. for 15 minutes to dry the coating film to produce an electrophotographic belt according to Example 1.

Examples 2 and 3

Electrophotographic belts according to Examples 2 and 3 were produced as in Example 1 except that the blending amount of the fluorine rubber with respect to 1 part by mass of the fluorine resin was changed to those shown in Table 1.

Example 4

An electrophotographic belt according to Example 4 was produced as in Example 1 except that the blending amount of polyoxyethylene lauryl ether in the coating solution for forming a surface layer was changed to that shown in Table 1.

Example 5

An electrophotographic belt according to Example 5 was produced as in Example 1 except that the conductive agent in the coating solution for forming a surface layer was changed to polyoxyethylene myristyl ether (product name: Emulgen 4085, Kao Corporation).

Example 6

An electrophotographic belt according to Example 6 was produced as in Example 2 except that the blending amount of the polyoxyethylene lauryl ether in the coating solution for forming a surface layer was changed to that shown in Table 1.

Example 7

An electrophotographic belt according to Example 7 was produced as in Example 2 except that the fluorine resin in the coating solution for forming a surface layer was changed to PFA. Incidentally, a water dispersion of PFA particles (product name: 945HP PLUS, manufactured by Chemours-Mitsui Fluoroproducts Co., Ltd.) was used. This water dispersion contained 38 wt % of PFA particles (particle size: 0.2 μm).

Comparative Example 1

A coating solution for forming a surface layer was prepared as in Example 1 except that polyoxyethylene lauryl ether as the conductive agent was not used. An electrophotographic belt according to Comparative Example 1 was produced as in Example 1 except that this coating solution for forming a surface layer was used.

Comparative Example 2

A coating solution for forming a surface layer was prepared as in Example 1 except that the blending amount of the fluorine rubber was 1.5 parts by mass with respect to 1 part by mass of the fluorine resin. An electrophotographic belt according to Comparative Example 2 was produced as in Example 1 except that this coating solution for forming a surface layer was used.

Comparative Example 3

A coating solution for forming a surface layer was prepared as in Example 1 except that the polyoxyethylene lauryl ether as the conductive agent was changed to carbon black (product name: Denka Black, manufactured by Denka Co., Ltd.). An electrophotographic belt according to Comparative Example 3 was produced as in Example 1 except that this coating solution for forming a surface layer was used.

The prescriptions of the coating solution for forming a surface layer according to Examples and Comparative Examples are collectively shown in Table 1.

TABLE 1

| | | Fluorine resin material type (A) | Fluorine rubber material type (B) | A:B (mass part ratio) | Conductive agent | * Conductive agent content rate [mass %] |
|---|---|---|---|---|---|---|
| Example | 1 | FEP | FKM | 1:1 | Polyoxyethylene lauryl ether | 3 |
| | 2 | FEP | FKM | 1:0.5 | Polyoxyethylene lauryl ether | 3 |
| | 3 | FEP | FKM | 1:0.8 | Polyoxyethylene lauryl ether | 3 |
| | 4 | FEP | FKM | 1:1 | Polyoxyethylene lauryl ether | 8 |
| | 5 | FEP | FKM | 1:1 | polyoxyethylene myristyl ether | 3 |
| | 6 | FEP | FKM | 1:0.5 | Polyoxyethylene lauryl ether | 5 |
| | 7 | PFA | FKM | 1:0.5 | Polyoxyethylene lauryl ether | 5 |
| Comparative Example | 1 | FEP | FKM | 1:1 | — | — |
| | 2 | FEP | FKM | 1:1.5 | Polyoxyethylene lauryl ether | 3 |
| | 3 | FEP | FKM | 1:1 | Carbon black | 3 |

* Based on the sum of mass of (A) and mass of (B)

Evaluation

The electrophotographic belts produced in Examples 1 to 7 and Comparative Examples 1 to 3 were subjected to the following evaluations 1 to 5. Table 2 shows the evaluation results.

Evaluation 1: Measurement of Surface Free Energy

The surface free energy of the outer surface of an electrophotographic belt was calculated by "the method of Kitazaki and Hata" described in "Journal of the Adhesion Society of Japan", The Adhesion Society of Japan, 1972, Vol. 8, No. 3, pp. 131-1411.

Specifically, the contact angles of the surface layer 203 of the intermediate transfer member 200 with water, n-hexadecane, and diiodomethane were measured (measurement environment: a temperature of 23° C. and a relative humidity of 55%).

Subsequently, the surface free energies were determined using the measurement results of the respective contact angles by the "Extension of Fowkes' Equation" according to the descriptions of "2. Extension of Fowkes' Equation" on page 131 to "3. Surface tension of polymer solid and its components" in "Journal of the Adhesion Society of Japan", The Adhesion Society of Japan, 1972, Vol. 8, No. 3, pp. 131-1411.

The contact angle was measured using a contact angle meter (product name: DM-501, manufactured by Kyowa Interface Science Co., Ltd.), and the surface free energy was analyzed using analysis software (product name: FAMAS, manufactured by Kyowa Interface Science Co., Ltd.).

Evaluation 2: Measurement of Elastic Coefficient of Surface Layer

In the measurement of elastic coefficient of a surface layer, tensile stress was measured by pulling a test piece cutout from the surface layer 203 at a pulling rate of 0.055 mm/s at room temperature using a tensile tester. A graph with strain of each test piece on the horizontal axis and tensile stress on the vertical axis was formed from the measurement results, and the slope when the measurement data were linearly approximated in a strain range of 0% to 10% was defined as the elastic coefficient.

Specifically, a test piece with a length of 20 mm and a width of 5 mm was cutout from a surface layer, and the thickness was measured with a digital length measuring system (product name: DIGIMICRO MF-501, manufactured by Nikon Metrology, Inc.). Incidentally, the test piece was cutout such that the longitudinal direction of the test piece corresponds to the circumferential direction of the rotation member. Both ends of the test piece in the longitudinal direction were fixed to clamps of a tensile tester (product name: Rheogel-E4000, manufactured by UBM Co., Ltd.), and the test piece was stretched in a room temperature environment at a pulling rate of 0.055 mm/s.

Thus, a stress-strain curve for the test piece was formed, and the slope when the measurement data were linearly approximated in a strain range of 0% to 10% was defined as the elastic coefficient.

Evaluation 3: Surface Resistivity

The surface resistivity of the outer surface of an electrophotographic belt was measured by a double electrode method using a high resistivity meter (product name: Hiresta UP Model MCP-HT450, manufactured by Nittoseiko Analytech Co. Ltd. (former company name: Mitsubishi Chemical Analytech Co., Ltd.). The measurement condition was adjusted to a temperature of 23° C. and a relative humidity of 50%, and a UR probe was brought into contact against the outer surface of the surface layer 203. The value at an application voltage of 1000V and a measurement time of 10 seconds was defined as a measurement value, the measurement was performed at 4 points at every 900 in the circumferential direction of the surface layer 203, and an average of the measurement values was calculated. The average was defined as the surface resistivity of the outer surface of the electrophotographic belt.

Evaluation 4: Volume Resistivity

The volume resistivity of an electrophotographic belt was measured by a double-ring electrode method according to Japanese Industrial Standard (JIS) K6271-1:2015 using a high resistivity meter (product name: Hiresta UP Model MCP-HT450, manufactured by Nittoseiko Analytech Co. Ltd.). Specifically, a ring-type UR probe (model: MCP-HTP12, manufactured by Nittoseiko Analytech Co. Ltd.) was brought into contact against the outer surface of the surface layer 203 in an environment of a temperature of 23° C. and a relative humidity of 50%. The value at an application voltage of 1000V and a measurement time of 10 seconds was defined as a measurement value, the measurement was performed at 4 points at every 900 in the circumferential direction of the surface layer 203, and an average of the measurement values was calculated. The average was defined as the volume resistivity of the outer surface of the electrophotographic belt.

Evaluation 5: Secondary Transfer Efficiency to Recording Medium Having Surface Unevenness of 100 μm or More An electrophotographic belt as an evaluation target was installed on a full-color electrophotographic image-forming apparatus (product name: imagePRESS C800, manufactured by CANON KABUSHIKI KAISHA) as the intermediate transfer belt. A blue solid image was formed on the surface having unevenness of A4 size embossed paper (product name: LEATHAC 66, manufactured by Takeo Co., Ltd., surface unevenness: 140 μm). Incidentally, the solid image was formed using cyan and magenta developers loaded in the print cartridge of the electrophotographic image-forming apparatus. The solid image was formed in a normal temperature and humidity (temperature: 25° C., relative humidity: 55%) environment.

Incidentally, the secondary transfer vias of the electrophotographic image-forming apparatus was set to 2000 V.

Specifically, the process of forming a blue solid image was performed until before the secondary transferring step and was stopped before the secondary transferring step. The amount (WA) of toner constituting the unfixed toner image on the outer peripheral surface of the electrophotographic belt was measured. Subsequently, all toner on the outer peripheral surface of the electrophotographic belt was removed. Then, the subsequent process of forming a blue solid image was performed to the end to secondarily transfer the blue solid image to the uneven surface of the uneven paper. The amount (WB) of the transfer residual toner remaining on the outer peripheral surface of the electrophotographic belt after the secondary transfer was measured. The secondary transfer rate (%) of the toner was calculated by the following calculation expression (1) and evaluated according to the following criteria:

$$\text{The secondary transfer rate (\%)}=[(WA-WB)/WA]\times 100 \quad (1)$$

Rank A: 95% or more;

Rank B: 90% or more and less than 95%; and

Rank C: less than 90%.

Evaluation Results

Regarding the intermediate transfer members 200 of Examples and Comparative Examples, the measurement results or evaluation results of the surface free energy, the elastic coefficient, surface resistivity, and volume resistivity of surface layer 203, and transferability to uneven paper are shown in Table 2.

TABLE 2

| | | Surface free energy [mN/m] | Elastic coefficient [MPa] | Surface resistivity [Ω/□] | Volume resistivity [Ω · cm] | Secondary transfer efficiency [%] | Evaluation rank |
|---|---|---|---|---|---|---|---|
| Example | 1 | 20 | 85 | $3.0 \times 10^{10}$ | $2.5 \times 10^{10}$ | 95 | A |
| | 2 | 17 | 93 | $2.8 \times 10^{10}$ | $2.3 \times 10^{10}$ | 92 | B |
| | 3 | 19 | 89 | $2.8 \times 10^{10}$ | $2.3 \times 10^{10}$ | 96 | A |
| | 4 | 20 | 86 | $1.9 \times 10^{10}$ | $1.5 \times 10^{10}$ | 97 | A |
| | 5 | 20 | 85 | $2.9 \times 10^{10}$ | $2.4 \times 10^{10}$ | 95 | A |
| | 6 | 17 | 93 | $2.2 \times 10^{10}$ | $1.8 \times 10^{10}$ | 95 | A |
| | 7 | 19 | 97 | $3.2 \times 10^{10}$ | $2.8 \times 10^{10}$ | 90 | B |
| Comparative | 1 | 20 | 85 | $4.1 \times 10^{11}$ | $7.5 \times 10^{11}$ | 70 | C |
| Example | 2 | 30 | 75 | $3.3 \times 10^{10}$ | $2.8 \times 10^{10}$ | 75 | C |
| | 3 | 20 | 102 | $2.5 \times 10^{10}$ | $2.0 \times 10^{10}$ | 86 | C |

The electrophotographic belts according to Comparative Examples 1 to 3 all had low secondary transfer efficiencies.

It is inferred that since the surface layer of the electrophotographic belt according to Comparative Example 1 did not include a conductive agent and had a high surface resistivity, a sufficient transfer voltage could not be applied to the toner in the secondary transferring step.

The secondary transfer efficiency was low also in Comparative Example 2. This is inferred that since the amount of fluorine rubber with respect to fluorine resin was high in the electrophotographic belt according to Comparative Example 2, the surface layer had a low elastic coefficient but had a high surface free energy and that accordingly, the adhesion of the unfixed toner image on the outer peripheral surface of the electrophotographic belt to the outer peripheral surface was relatively strong, and the toner releasability in the secondary transferring step became low.

Furthermore, in Comparative Example 3, it is inferred that since carbon black was used as the conductive agent, the elastic coefficient of the surface layer was high and that accordingly, the surface of the electrophotographic belt could not be sufficiently adapted to the uneven surface of the recording medium, and the secondary transfer efficiency was therefore decreased.

In contrast, the electrophotographic belts according to Examples 1 to 7 could secondarily transfer unfixed toner images to the uneven surface of a recording medium with high efficiency. This is inferred that the surface layer could be appropriately imparted with conductivity without causing an increase in the hardness of the surface layer by making the surface layer electroconductive by polyoxyalkylene alkyl ether.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-197198 filed Dec. 3, 2021, which is hereby incorporated by reference herein in its entirety.

What is claimed is:

1. An electrophotographic member comprising:

a base layer, an elastic layer, and a surface layer stacked in this order, the surface layer containing a fluorine resin and a fluorine rubber, wherein the fluorine rubber is contained at a proportion of 0.5 parts by mass or more and 1.0 parts by mass or less with respect to 1 part by mass of the fluorine resin, and the surface layer further contains a compound represented by formula (1):

$$CH_3(CH_2)_m—O—((CH_2)_lO)_n—OH \quad (1),$$

in formula (1), m, l, and n each independently represent an integer of 1 or more.

2. The electrophotographic member according to claim 1, wherein a content of the compound represented by formula (1) in the surface layer is 1 mass % or more and 10 mass % or less with respect to the surface layer.

3. The electrophotographic member according to claim 1, wherein the compound represented by formula (1) is at least one ether selected from the group consisting of polyoxyethylene lauryl ether and polyoxyethylene myristyl ether.

4. The electrophotographic member according to claim 1, wherein the surface layer has a surface resistivity of $1.0\times10^7$ Ω/square or more and $3.0\times10^{11}$ Ω/square or less.

5. The electrophotographic member according to claim 1, wherein the surface layer has an elastic coefficient of 50 MPa or more and 100 MPa or less.

6. The electrophotographic member according to claim 1, wherein the fluorine resin is at least one resin selected from the group consisting of a tetrafluoroethylene-hexafluoropropylene copolymer (FEP) resin, a tetrafluoroethylene-perfluoroalkyl vinyl ether copolymer (PFA) resin, and a tetrafluoroethylene (PTFE) resin.

7. The electrophotographic member according to claim 1, wherein the fluorine rubber is at least one rubber selected from the group consisting of a vinylidene fluoride rubber (FKM), a tetrafluoroethylene-propylene rubber (FEPM), and a tetrafluoroethylene-perfluoromethyl vinyl ether rubber (FFKM).

8. The electrophotographic member according to claim 1, wherein a content of the fluorine resin in the surface layer is 50 mass % or more and 66 mass % or less based on a total mass of the surface layer.

9. The electrophotographic member according to claim 1, wherein the surface layer has a thickness of 5 μm or more and 30 μm or less.

10. The electrophotographic member according to claim 1, wherein the elastic layer contains a silicone rubber.

11. The electrophotographic member according to claim 1, being an electrophotographic belt having an endless belt shape.

12. The electrophotographic member according to claim 1, being an intermediate transfer member.

13. An electrophotographic image-forming apparatus comprising an intermediate transfer member, wherein the intermediate transfer member is constituted of an electrophotographic member; and the electrophotographic member includes a base layer, an elastic layer, and a surface layer stacked in this order, wherein the surface layer contains a fluorine resin and a fluorine rubber, the fluorine rubber is contained at a proportion of 0.5 parts by mass or more and 1.0 parts by mass or less with respect to 1 part by mass of the fluorine resin, and the surface layer further contains a compound represented by formula (1):

$$CH_3(CH_2)_m—O—((CH_2)_lO)_n—OH \quad (1),$$

in formula (1), m, I, and n each independently represent an integer of 1 or more.

* * * * *